Boris Beizer
INVENTOR.

BY *Harvey A. David*
*John M. [signature]*

ATTORNEYS

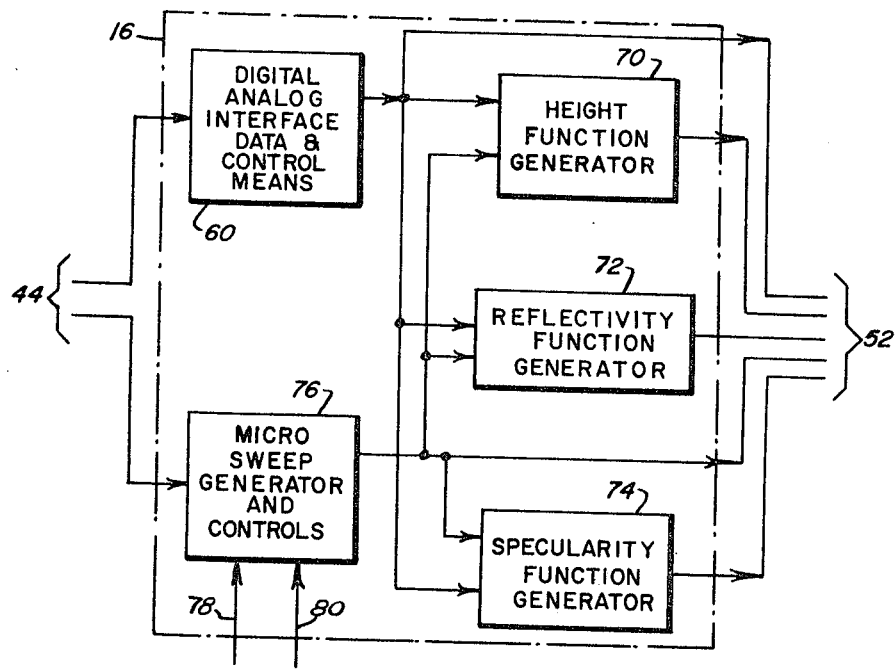
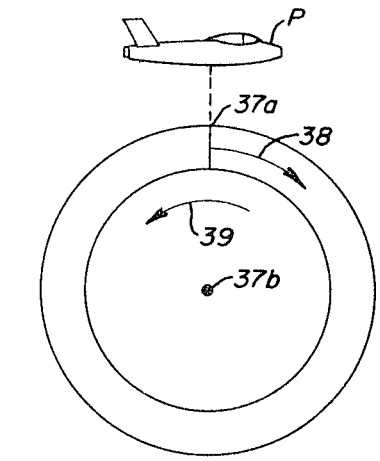
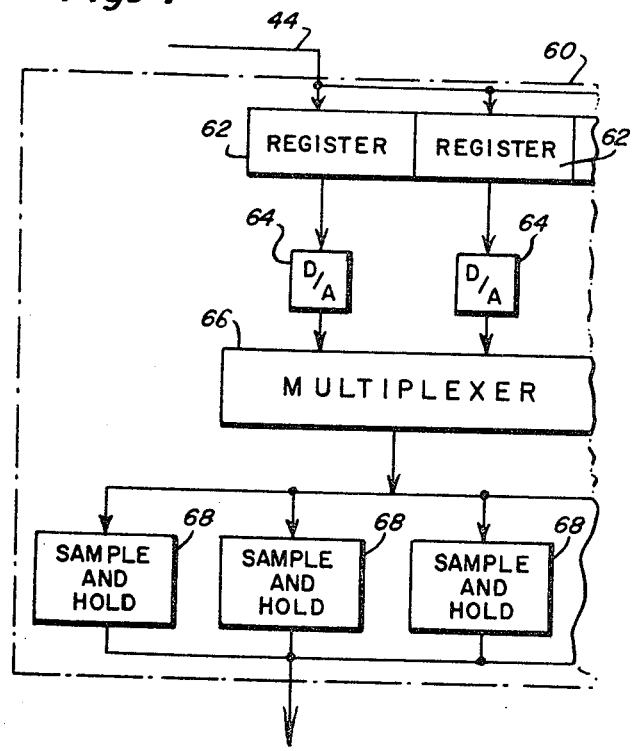

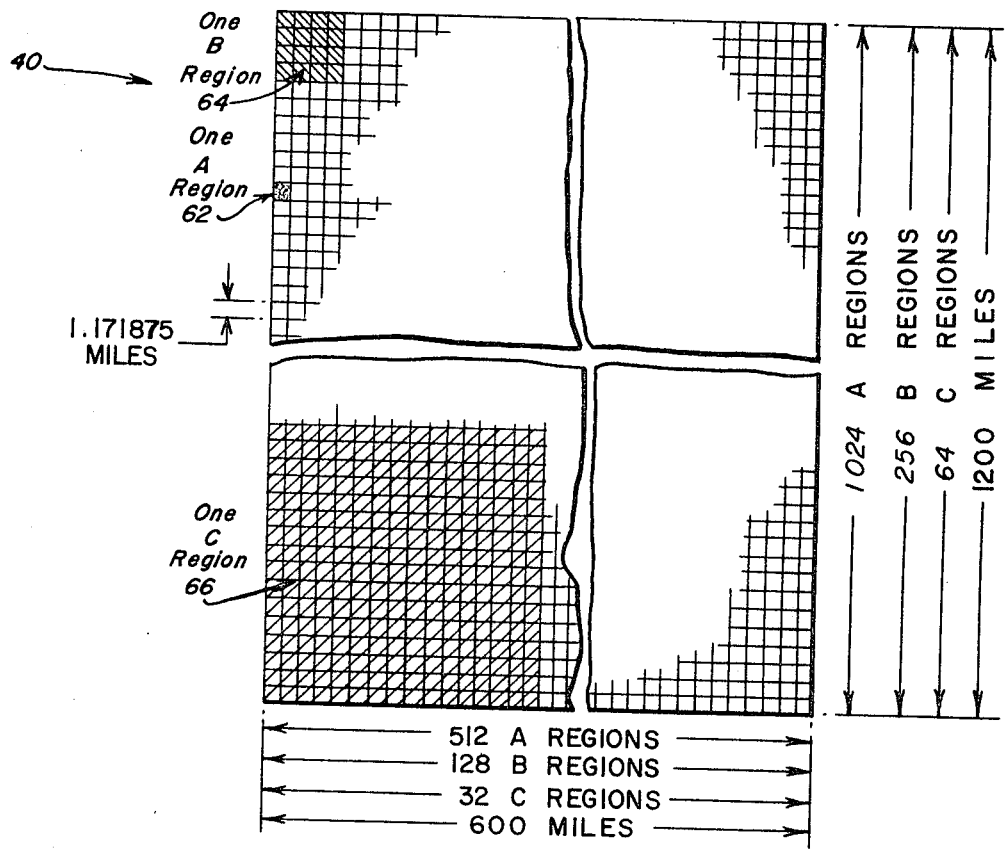
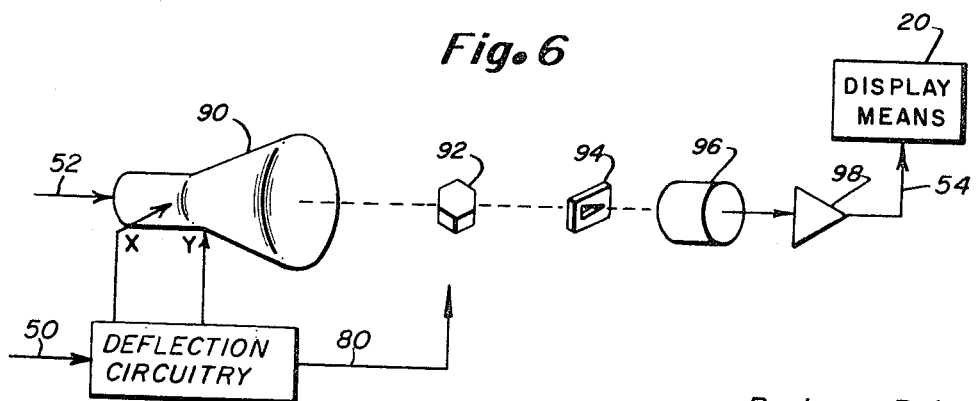

United States Patent Office 3,446,903
Patented May 27, 1969

3,446,903
RADAR LANDMASS SIMULATION
Boris Beizer, Bussum, Netherlands, assignor, by mesne assignments, to the United States of America
Filed Apr. 18, 1967, Ser. No. 632,161
Int. Cl. G09b 9/00
U.S. Cl. 35—10.4
8 Claims

ABSTRACT OF THE DISCLOSURE

A digitally oriented radar landmass simulator comprising a general purpose digital computer in combination with special purpose analog function generators providing a system including an aircraft computer, a terrain data generator, a terrain function generator, a display computer, and display means.

Background of the invention

Since the initial development of airborne mapping radars in the early 1940's, there has been a demand for an effective and realistic radar landmass simulator. Training in airborne radar operation has depended upon use of simulator trainers. Although these simulators have used differing techniques (ultrasonic, optical, etc.) they have had a common fundamental method of operating, that method being termed a "physical analog." In each of the prior are devices there has been a physical model of the terrain, which model is in some sense analogous to the actual terrain. A physical transducer, in the prior simulators, is moved over the model in direct analogy to the manner in which the radar is flown over the actual terrain.

Each of the simulation system based on physical analogy has offered certain advantages and disadvantages when compared to other techniques. As with any physical model, there are limits imposed on the accuracy, resolution, and repeatability of the data that can be derived by coupling a transducer to the model. Indeed, there are physical limits of accuracy with which a model can be constructed. Either the mapping scale factor is too large and the model is unwieldly or the model is manipulable and the accuracy suffers. The equipment limits on accuracy and repeatability with which the operational radars can view their terrain targets do not, however, appear to be near to being approached.

Examples of the prior art systems include photographic analog systems based on "factor transparency" models. In a factor transparency system, a photographic plate is used to represent the height at a point, another plate is used to represent the reflectivity of the terrain, and still other plates may be used to store other contributing factors. A flying spot scanner is used to illuminate the factor transparency(ies) and the transmitted light is picked up by a photoreceptor. The spot of the flying spot scanner is moved along a path corresponding to the radar sweep. The resulting output of the photoreceptor is an analog waveform corresponding to the factor being scanned, e.g., height or reflectivity. The various waveforms generated via these transparencies are combined in a display computer to produce the "video" waveform which is displayed. The display computer incorporates various effects such as shadows and attenuation and, therefore, in a limited sense incorporates basic features of the video signal.

The factor transparency simulation is limited in several important respects, primarily due to optical problems and the difficulty of controlling the size and shape of the flying spot. The beam of a radar is not parallel. There is some spreading in azimuth. This can be simulated to a limited extent by causing the flying spot to expand in azimuth as the sweep range is increased. However, the lateral expansion of the beam is accompanied by a comparable longitudinal expansion which is equivalent to increasing the pulse width of the radar pulse. The return amplitude of the actual radar's return is the integrated return over the finite pulse width; i.e., the length of a typical radar pulse is of the order of a thousand feet. The return seen on the radar screen at any given point is the sum of all the returns over an extent of a few thousand feet. The spot, however, has a minimum size, and consequently the simulated return for radars using short pulses tends to be blurred.

Another limitation of the factor transparency method is that the resolution is tied directly to the size of the problem area. The combination of spot size, photographic grain size, and optics limits the resolution; i.e., in order to accommodate a sufficiently large problem area, the resolution of individual points must be limited to approximately 250 feet, or else the size of the photographic plates would be excessive.

The factor transparency system can be designed to incorporate the primary contributing elements of the radar return, such as height, terrain gradient, reflectivity, and specularity. However, this would require one plate for height, two for terrain gradient, one for reflectivity, and three for specularity, for a total of seven plates to be synchronized and registered to within a few mils. The practical difficulties involved have limited factor transparency systems to the simulation of the basic radar return signal.

Summary of the invention

In view of the foregoing, it is a primary object of the invention to provide a digitally oriented radar landmass simulator wherein terrain data is digitally stored in a mass memory such as magnetic tape or disc means. Instead of a flying spot sweep over a transparency, a search is made by computer through the memory, and data appropriate to the point in question is brought out in synchronism with the sweep. The data is then converted to analog waveforms or profiles of the various factors and to radar return signal elements by a display computer similar in concept to that used in factor transparency systems.

The primary advantages of a digital simulator are that resolution is not directly related to problem areas; that high resolution data may be used in areas with many features; and that low resolution data may be used in monotonous regions. Similarly, coarse data may be used at far range and fine data at near range. This characteristic of digital storage allows the exploitation of inherent terrain redundancies not feasible in analog systems. The analog system must be designed to suit the worst case, whereas the digital system is much more flexible.

Furthermore, the problem area in a digital system need not be of fixed shape. The problem area can be patched out of several base maps with almost unlimited flexibility—for example, a very long, narrow corridor with an operational area at the end, whose overall length can exceed a few thousand miles. Patching of maps is done digitally under computer control and can be considered a field operation. The equivalent procedure for factor transparencies is much more cumbersome. Finally, it is recognized that the cost of a factor transparency simulator is proportional to the number of factors taken into account. Although a digital simulator may have a higher base cost, it can accommodate a wide variety of radar effects with small incremental costs, resulting in a simulator which for a given high-performance level is less costly than the equivalent factor transparency system.

Brief description of the drawings

FIG. 3 is a block diagram of the terrain function generator of the simulator of FIG. 1;

FIG. 4 is a block diagram of a section of the terrain function generator of FIG. 3;

FIG. 5 is a diagram illustrating a problem area covered by the simulator of FIG. 1 and its division into, high, medium and low resolution regions;

FIG. 6 is a schematic illustration of scan conversion means forming part of the display computer; and FIG. 7 is a diagrammatic view illustrating a concept of sub-memory data.

Description of the preferred embodiment

Figure 1:
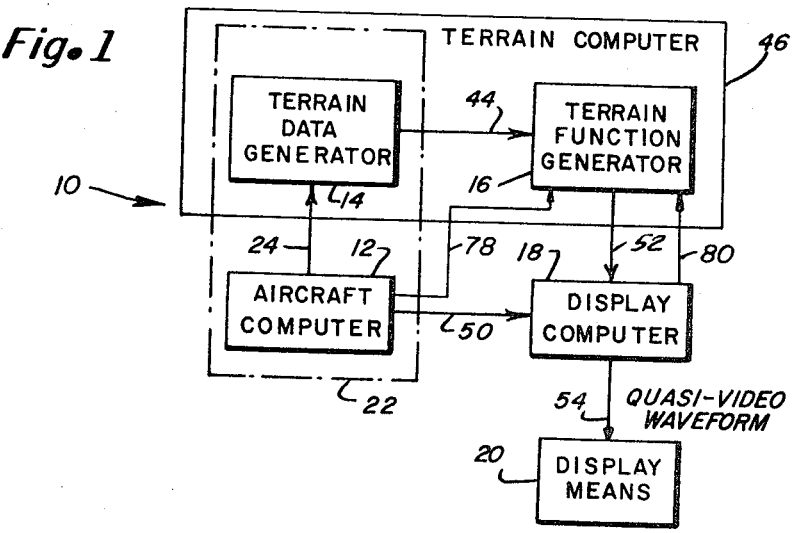
FIG. 1 is a simplified block diagram of a digitally oriented radar landmass simulator embodying the present invention.

In the form of the invention illustrated in the drawings and described hereinafter, there is provided a digitally oriented radar landmass simulator, generally indicated at 10. The simulator 10 is subdivided into an aircraft computer 12, a terrain data generator 14, a terrain function generator 16, a display computer 18, and display means 20, each of which will be more fully discussed as the description proceeds.

The aircraft computer 12, which is conveniently in the form of a portion of a general purpose digital computer system 22, is programmed to provide aircraft velocity, position, and orientation (or rather the antenna boresight) with respect to the terrain of the problem area. The effects of wind on the position of the aircraft and the overall dynamic response of the system to the changes in aircraft position and orientation initiated by the pilot are also handled by the aircraft computer. The use of digital computers in providing aircraft dynamics performance data is well known to those versed in the art of flight simulation and need not be further discussed herein.

The aircraft computer 12 provides aircraft position and orientation, and the direction of the radar sweep with respect to the aircraft (antenna boresight angles) as input data to the terrain data generator 14 as indiacted by flow line 24.

Figure 2:
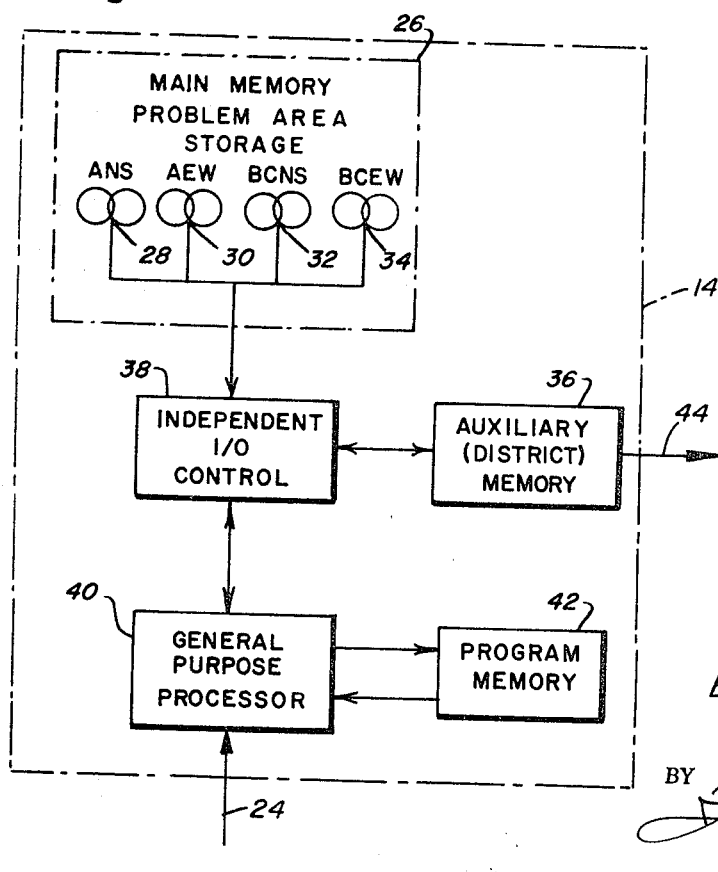
FIG. 2 is a block diagram of the terrain data generator of the simulator of FIG. 1.

The terrain data generator 14, which may also conveniently be a portion of the general purpose digital computer system 22, provides data concerning the height, terrain gradient, reflectivity, specularity, and other factors for the portion of the terrain within the range setting of the radar being simulated. The terrain data generator 14, as implemented in the general purpose digital computer system 22, and as is best illustrated in FIG. 2, comprises a main store 26 for problem area storage. The main store 26 may be either magnetic tape or disc and in this embodiment comprises a plurality of tape transports 28, 30, 32 and 34. The terrain data generator 14 further comprises a district memory 36 which is implemented as an off-line auxiliary high-speed magnetic core memory controlled by an independent I/O (input-output) control 38 of the computer system 22, the I/O control 38 being under the control of a general purpose processor 40 and program memory 42 of the computer system 22.

The outputs of the terrain data generator 14 are presented as indicated by line 44 to the terrain function generator. The terrain data generator 14 and terrain function generator 16 may be considered together as a terrain computer 46. The outputs of the terrain data generator 14 are presented to the terrain function generator 16 which converts the discrete digital data to continuous profiles.

The display computer 18 receives inputs as shown in FIG. 1 by flow lines 50 and 52, respectively, from the aircraft computer 12 and from the terrain function generator 16. The display computer 18 has as its primary function the transformation of the various profiles provided by the terrain function generator 16 into a quasi-video waveform for insertion into the simulator display. In doing this, the display computer effects a transformation from system time to real time. The terrain data generator 14 and the terrain function 16 do not operate in real time within a given sweep. They do operate in real time as averaged from sweep to sweep. The conversion to real time by averaging is effected by a scan conversion portion of the display computer 18, that portion being later described with reference to FIG. 6. In addition, the display computer 18 carries out other computations common to radar landmass simulators. Its computations consist of those required for shadow determination, weather noise, antenna pattern, and similar radar effects. These computations may be handled by the display computer 18 in any well known manner such as is the shadow computation in U.S. Patent No. 3,131,247 of D. A. Benamy et al., the weather noise may be a simple random noise signal insertion, and the antenna pattern may be effected by mask or filter means such as the filter 94 later referred to herein. The display computer also handles the weighting of data from calculations on problem area regions of different sizes, scale factors, etc., to allow a smooth transition during the decrease in resolution from minimum to maximum range. The display computer 18 provides analog information in the form of a quasi-video waveform, as indicated by flow line 54, to the display means 20 which preferably comprises a cathode ray tube type of radar display means, and associated IF modulation means for converting the quasi-video to a signal usable by conventional radar display equipment.

The area which might be "seen" by the aircraft's radar at some time during the course of a simulation is called the problem area 40 (FIG. 5), and as an example will be assumed to be a 600 by 1200 nautical mile segment of the earth's surface. This is the area which is stored on the magnetic tapes 28, 30, 32 and 34 of the main memory 26 (or more precisely, the area of which terrain characteristics are represented by data stored on the magnetic tapes). During a simulation, data currently of interest is transferred from the tapes of the main memory 26 to the district memory 36. As data points are needed by the terrain function generator 16, they are read from the district memory 36 under the control of the I/O control 38.

In order to minimize the amount of high speed magnetic core memory required in the district memory 36, use is made of the fact that a radar does not have as much resolution at long ranges as it has at short ranges. Thus, not as much information is required about terrain which is far from the simulated aircraft as that which is close to it.

Accordingly, the problem area 60 is represented by data with a plurality of levels or degrees of resolution. In the present example three levels of resolution are used, which means that the problem area 60 is represented three times on the magnetic tapes 28, 30, 32 and 34 of the main memory 26, each time with a different resolution. Note that this does not require three times as much tape as for one representation, as the areas of lesser resolution are represented by much less data as will presently be made apparent.

The problem area 60 is first divided as an entirety into a number of square, high resolution A regions 62, again into medium resolution B regions 64, and again into low resolution C regions 66. A region is defined as an area which can be represented by a predetermined amount of data. Thus, each of the A, B, and C regions 62, 64, and 66 contain the same amount of data but, because the B regions 64 are of medium resolution they each cover a larger area than the A regions 62 as is seen from inspection of FIG. 5. Similarly the C regions 66 each cover a larger area than the B regions 64.

In the present example consider that high resolution is required for effective simulation out to the first nine miles from the aircraft, and that an A region size of a little more than one mile square (1.171875 nautical miles on a side) will produce the desired density of high resolution data. Then the problem area 60 would be divided into 1024 high resolution regions along the length of the problem area, and 512 along the width thereof, making 524,288 square regions 62 of high resolution in the problem area.

For a medium resolution range, for example out to forty miles from the aircraft, medium resolution B regions 64 of sixteen times the area of A regions 62 are used, the B regions each being a square of 4.6875 nautical miles on a side. A low resolution range of out to the 200 mile limit of the radar being simulated is represented by the C regions 66 each of sixteen times the area of a B region 64 or 18.75 miles square. Thus there are 32,768 B regions 64 and 2048 C regions 66 in the problem area 60.

The designations ANS, AEW, BCNS, BCEW in FIG. 2 refer to A tapes north-south, A tapes east-west, BC tapes north-south, and BC tapes east-west, respectively. The separation of the tapes into A and BC tapes reduces the tape access time, making it compatible with the data input requirements of the main store 26 and allowing a smaller district memory 36 than would have been required otherwise.

The method of selecting the tape transport to be used during a given simulation problem is: If the aircraft direction is primarily north-south, an east-west strip is selected. If the aircraft motion is primarily east-west, a north-south strip is selected. The choice strip width is compatible with the maneuverability of the aircraft and does not require tape transports with capabilities exceeding that of commercially available low-cost units.

The district memory 36 is fed with data from the main store 26 and includes only those sections whose resolution correspond to the resolution required up to the maximum range possible for the radar being simulated. In the present example, the district memory 36 contains data for 576 regions of each type (A, B, C).

Functionally, the district memory 36 consists of three sub-memories, one for storage of terrain data for each type (A, B, C) of region. The arrangement of data in each of these sub-memories may be mentally likened to a torroid such as 37, with the aircraft P positioned thereover as shown in FIG. 7. The sub-memory may be considered to have a central point which is located directly below the aircraft P and which central point locates the boundary 37a between forward and rear data with respect to the aircraft radar. To simulate forward motion of the aircraft, memory data is not shifted within the submemory, but instead, the central point or boundary 37a of the sub-memory is redefined in the direction of the arrow 38. In effect, the toroid 37 is rotated about its axis 37b in the direction of the arrow 39. Thus, information to be entered ahead of the aircraft is loaded into memory locations corresponding to points of the toroid 37 which are behind the aircraft, and the redefinition of the boundary 37a and rotation of the toroid 37 will bring that information into the path of the aircraft.

As the main store 26 is serially accessed for sections in an east-west direction, those sections due north of the center of the district memory 36 (the center corresponding to the aircraft position) are transferred from tape to the district memory with data at all three resolutions. Slightly to the east and west of the due north point, the district memory is fed with only B and C region data. At the extremes of the radar scan, where only low resolution data is required, only size C regions are taken from main store and placed into the district memory. The main store 26 is organized so that it needs to be traversed only once in an east-west direction for the short-range A regions 42, intermediate-range B regions 44, and long-range C regions 46, the range being measured in a north-south direction.

Data from the main store 26 is examined at a rate of approximately 308 and 900 A regions per second in the present example, of which 64 are stored every 6.6 seconds. Thus, the tape problem for the simulator consists primarily in finding the data to be entered, rather than entering it as such. Each region consists of approximately 32 characters, resulting in a character transfer rate of 29,000 characters per second if all data were transferred. These rates are well within the capabilities of commercially available low-cost magnetic tape transports.

Information enters the district memory 36 at a maximum rate of 800,000 bits per second. It is called from district memory at a maximum rate of 24,000,000 bits per second. These speeds are scaled to correspond to the average distance traversed by a two-way sweep in 14 microseconds. It should be noted that the 14 microseconds is in average figure. In traversing the A regions, the signal sweeps at a rate corresponding to approximately 20 microseconds (which is somewhat slower than required). However, in the B and C regions the sweep traverses at an equivalent speed of 4 and 16 times the speed of light to make up for the difference. At the start of each sweep an initial calculation must be performed, which absorbs a few hundred microseconds. Similarly, at the entry to the B and C regions the sweep must hesitate. A smaller hesitation of a few microseconds is required at the entry to each region. Furthermore, depending upon the boundary conditions and the flight path, the entry to a given region may require pulling new data for up to three regions simultaneously. The net result is that the speed gained in going through the B and C regions at several times the speed of light is completely absorbed, and the sweep-to-sweep relation maintains synchronism with real time.

The data required to establish a portion of the sweep being processed is accessed from the district memory 36 and sent to the terrain function generator 16, best illustrated in FIG. 3. The terrain function generator 16 accepts the digital terrain data from the terrain data generator 14 and converts it to a set of analog waveforms or "profiles." A profile corresponds to the portion of the data which would be generated for a single sweep of the simulated radar; in the case of azimuthal beam spreading simulation, for example, it corresponds to the elementary return of an azimuthal segment of the sweep.

The data provided by the terrain function generator of the present embodiment includes the following profiles: terrain height, terrain gradient, reflectivity, and specularity. The inputs to the terrain function generator are digital and the outputs are analog. In a sense the terrain function generator 16 is the digital-to-analog converter of the system.

FIG. 4 shows in detail part of the block diagram of the terrain function generator 16 shown in FIG. 3. Referring to FIG. 4, data from the district memory 36 of the terrain data generator 14 enters the section 60 labeled Digital/Analog Interface Data and Control Means. The data enters a set of registers 62 forming part of section 60 and which are associated with a set of digital to analog converters 64 also part of section 60. These digital to analog converters are scanned by a multiplexer 66 and the analog signals distributed to a set of sample and hold circuits 68.

The analog outputs of the section 60 are applied to a height function generator 70 (FIG. 3), a reflectivity function generator 72, and a specularity function generator 74, in which generators the analog outputs provide the coefficients of polynomials representing certain features relating to height, reflectivity, and specularity of the terrain. For example the height function generator 70 utilizes analog outputs from the means 60 as coefficients in predetermined polynomial functions for height, gradients, and maximum heights. The height function generator 70 outputs to the display computer 18 are then the height, terrain gradients, and the maximum height in the region being considered. Similarly, analog outputs from the means 60 are inserted by the generator 72 as coefficients in polynomials representing reflectivity according to Lambert's Law, for example, while the analog outputs are inserted in other functions in the generator 74 to provide outputs characteristic of specularity which is related to attitude of the viewed terrain, especially with respect to cultural objects.

Also forming part of the terrain function generator 16 is the micro-sweep generator and controls section 76 which consists of a set of counters, controls and a digital to analog converter, which produces the lateral coordinates of the sweep point used by the terrain function generator 16 and the display computer 18. Inputs to the section 76 are from the aircraft computer 12 and display computer 18 as indicated at 78 and 80 of FIG. 3.

The outputs of the terrain function generator consist of a set of simultaneous profiles in height, reflectivity, terrain gradient, etc. The above discussion centered on the height profile reconstruction; however, the same general approach (at a much lower rate) applies for the reflectivity, terrain gradients, and other factors. For example, it is possible to extract the gradient components at the same time, using much of the same equipment as is used in the reconstruction of the height profiles. Reflectivity is done partly with the polynomial representation and partly with cultural data representation.

It should be noted that it is possible to set up the data map of the problem area in such a manner as to deal with either primarily cultural regions or primarily natural terrain. The above discussion presumed fixed region sizes designated as A, B, and C regions. However, since it is possible to progress with a variable rate through a region, it might prove more effective to include many more region sizes (with ratios of 1, 2, 4, 8, 16, 32 as against 1, 4, 16 for the present system). This approach would result in further reduction of memory and possibly of processing time. The net result would be to use extremely small regions; i.e., 1000 x 1000 feet, in areas for high cultural densities, intermixed with large regions for such areas as parks.

The outputs of the terrain function generator 16 and aircraft computer 12 are combined by the display computer 18, which performs a ground-to-slant-range conversion, in addition to shadow computations and simulation of various radar effects. The ground-to-slant range conversion, which of course is merely converting ground range by a function of aircraft altitude and terrain height, as well as the shadow computation and other radar effects, are carried out in the display computer 18 in the same manner as has been done in prior radar landmass simulators. The portion of the display computer 18 which differs from the prior art is the use of a scan conversion system to convert the outputs to real time. The calculated video profile output of the terrain function generator 16 is conveniently displayed in the display computer on a scan conversion tube 90 (FIG. 6), and is not yet a real-time signal; i.e., it is painted on at various scale rates and has many stops and starts. Of major importance is the fact that the sweep-to-sweep average is in real time. The data which has been calculated, i.e., the several micro-sweeps which may make up a single displayed sweep, is coded in an intensity modulation form. The persistance of the face of the scan-converter tube 90 stores the information sufficiently long that the face may be scanned electromechanically by a rotating mirror or prism 92, filter means such as slit 94, and photocell 96 arrangement with suitable amplifier means 98 to yield an output proportional to the total illumination on the scan-converter tube face. The slit 94, or a suitable filter in the scanner arrangement, performs two functions; its vertical profile approximates the azimuthal beam pattern, and its horizontal profile approximates the transmitter pulse width. The scanned output is then the quasi-video signal which is presented to the display system 20.

If required, at that point, the quasi-video signal may be modulated to an appropriate IF and injected in the actual radar receiver which performs the normal terrain avoidance or contour mapping presentation of the video signal. Processing which is performed at RF in the real radar and which depends on wave optical effects (e.g., monopulse radar) are not simulated directly, but the net result of these—very small effective beamwidth—can be incorporated.

Obviously many modifications and variations of the present invention are possible in the light of the above teachings. It is therefore to be understood that within the scope of the appended claims the invention may be practiced otherwise than as specifically described.

What is claimed is:
1. A radar landmass simulator comprising:
digital, terrain data generator means including memory means for storing digital data representative of terrain characteristics for a predetermined problem area;
aircraft computer means for providing to said terrain data generator means signals representative of the flight of a simulated aircraft carrying a simulated radar over said problem area;
said terrain data generator means being responsive to said signals to provide, as an output, digital data representative of terrain characteristics swept by said simulated radar;
terrain function generator means connected to said terrain data generator and responsive to the digital output thereof to generate analog terrain profile functions as an output;
display computer means connected to said terrain function generator means and responsive to the output thereof to convert said functions into a quasi-video waveform; and
display means connected to said display computer and responsive to said quasi-video waveform to provide a simulated landmass radar presentation of said terrain characteristics swept by said simulated radar.

2. A radar landmass simulator as defined in claim 1, and wherein:
said digital, terrain data generator means comprises recording main memory means for storing digital data representative of terrain characteristics for a predetermined problem area;
district memory means for storing a predetermined portion of said digital data; and
input-output control means for controlling access of data from said main memory means for storage in said district memory means.

3. A radar landmass simulator as defined in claim 2 and wherein:
said main memory means comprises magnetic means for recording and storing data representative of said terrain characteristics for said problem area in its entirety a plurality of times, each with a different level or resolution; and
said district memory means comprises sub-memory means for storing a portion of said data for each level of resolution.

4. A radar landmass simulator as defined in claim 2 and wherein:
said main memory means comprises magnetic means for recording and storing concurrently data representative of said terrain characteristics of said problem area in its entirety a first time when divided into a plurality of A regions of a predetermined size and represented by a predetermined amount of data per region, a second time when divided into B regions which are larger in area than said A regions but each represented by the same predetermined amount of data per region as said A regions.

5. A radar landmass simulator as defined in claim 4 and wherein:
said magnetic means also records and stores concurrently data representative of said terrain characteristics of said problem area in its entirety a third time when divided into C regions which are larger in area than said B regions but each represented by the same amount of data as each of said A and B regions.

6. A radar landmass simulator as defined in claim 5 and wherein:
said main memory means comprises a plurality of magnetic tape and transport means; and
said district memory means comprises a magnetic core random access auxiliary storage means for storing said portions of said data for each of said A, B, and C regions.

7. A radar landmass simulator as defined in claim 6 and wherein:
said display computer means comprises scan conversion means including cathode ray tube means for displaying as a plurality sweeps thereon the outputs of said terrain function generator, and scanning and photocell means for converting said plurality of sweeps to said quasi-video waveform.

8. A radar landmass simulator means as defined in claim 7 and wherein:
said scanning means includes filter means for confining or modulating the scan of said sweeps on said cathode ray tube within a predetermined pattern.

References Cited

UNITED STATES PATENTS 3,355,538    11/1967    Thomas et al. _____ 35—10.4

RODNEY D. BENNETT, JR., *Primary Examiner.*

T. H. TUBBESING, *Assistant Examiner.*